(12) United States Patent
Philips et al.

(10) Patent No.: US 10,102,654 B1
(45) Date of Patent: Oct. 16, 2018

(54) SYSTEM AND METHOD FOR A SCALABLE INTERACTIVE IMAGE-BASED VISUALIZATION ENVIRONMENT OF COMPUTATIONAL MODEL SURFACES

(71) Applicant: Cascade Technologies, Inc, Palo Alto, CA (US)

(72) Inventors: David A. Philips, Palo Alto, CA (US); Phuc Vinh Quang, San Jose, CA (US); Babak Hejazialhosseini, Sunnyvale, CA (US); Michael Emory, Palo Alto, CA (US); Frank Ham, Palo Alto, CA (US)

(73) Assignee: Cascade Technologies, Inc., Palo Alto, CA (US)

( * ) Notice: Subject to any disclaimer, the term of this patent is extended or adjusted under 35 U.S.C. 154(b) by 127 days.

(21) Appl. No.: 15/220,151

(22) Filed: Jul. 26, 2016

Related U.S. Application Data

(60) Provisional application No. 62/197,570, filed on Jul. 28, 2015.

(51) Int. Cl.
| | |
|---|---|
| *G06T 19/00* | (2011.01) |
| *G06T 15/20* | (2011.01) |
| *H04N 13/111* | (2018.01) |
| *H04N 13/117* | (2018.01) |
| *G06T 11/20* | (2006.01) |
| *G06F 3/0484* | (2013.01) |
| *G06F 17/30* | (2006.01) |

(52) U.S. Cl.
CPC ........ *G06T 11/206* (2013.01); *G06F 3/04842* (2013.01); *G06F 17/3028* (2013.01);
(Continued)

(58) Field of Classification Search
CPC .......... G06F 3/14; G06T 11/001; G06T 11/60; G06T 2207/20221; G06T 2207/20212;
(Continued)

(56) References Cited

U.S. PATENT DOCUMENTS

| | | |
|---|---|---|
| 5,222,202 A | 6/1993 | Koyamada |
| 6,362,821 B1 | 3/2002 | Gibson et al. |

(Continued)

*Primary Examiner* — Chante Harrison
(74) *Attorney, Agent, or Firm* — Evergreen Valley Law Group; Kanika Radhakrishnan

(57) ABSTRACT

A computer-implemented method and system for visualizing an iso-surface is disclosed. The computer-implemented method includes generating a plurality of view-point images and view-point metadata of an iso-surface from the perspective of a plurality of view-points. Further, the computer-implemented method includes transferring one or more of the view-point images and view-point metadata to a client device. Furthermore, the computer-implemented method includes displaying the one of the view-point images on the client device. The computer-implemented method includes receiving a user indication for a new user selected view-point and sending a request to the High Performance Computing cluster for a new view-point image, wherein the new user selected view-point image is from non view-point orientation. The computer-implemented method also includes generating a new user view-point image and pixel depth metadata. Moreover, the computer-implemented method includes transmitting the new user view-point image and pixel depth metadata to the client device and displaying the new user view-point image, wherein the client uses a web interface to render the display image.

14 Claims, 6 Drawing Sheets

(52) U.S. Cl.
CPC .. *G06F 17/30268* (2013.01); *G06F 17/30864* (2013.01); *G06T 2200/24* (2013.01)
(58) Field of Classification Search
CPC ....... G06T 19/00; G06T 19/003; G06T 15/00; G06T 15/20; H04N 13/111; H04N 13/117; H04N 9/3188; H04N 9/3194
USPC .................. 345/418–419, 619, 581, 629
See application file for complete search history.

(56) References Cited

U.S. PATENT DOCUMENTS

| | | | |
|---|---|---|---|
| 7,965,291 B1 | 6/2011 | Uralsky | |
| 8,463,024 B1* | 6/2013 | Gallup | G06T 7/596 345/420 |
| 2003/0071194 A1* | 4/2003 | Mueller | G01B 11/00 250/208.1 |
| 2005/0018888 A1 | 1/2005 | Zonneveld | |
| 2007/0167801 A1* | 7/2007 | Webler | G06F 19/3437 600/459 |
| 2012/0321173 A1* | 12/2012 | Mitarai | G01B 11/03 382/154 |
| 2013/0300740 A1* | 11/2013 | Snyder | G06F 3/016 345/420 |
| 2015/0254042 A1* | 9/2015 | Seitz | G06F 17/30244 382/154 |
| 2016/0086379 A1* | 3/2016 | Sadi | G06T 19/006 345/633 |
| 2016/0171335 A1* | 6/2016 | Aguilera Perez | G06K 9/36 382/285 |
| 2017/0154440 A1* | 6/2017 | Sima | G06T 7/579 |

\* cited by examiner

SYSTEM AND METHOD FOR A SCALABLE INTERACTIVE IMAGE-BASED VISUALIZATION ENVIRONMENT OF COMPUTATIONAL MODEL SURFACES

TECHNICAL FIELD

Embodiments of the disclosure relate generally to the field of computer aided engineering, high performance computing (HPC), data analysis, and data visualization. Embodiments relate more particularly to a scalable interactive image-based visualization environment of computational model surfaces.

BACKGROUND

Current prior art visualization tools include Paraview for parallel remote visualization environments. Tecplot, Ensight are standard engineering data visualization tools. Paraview Catalyst provides in-situ visualization tools. CAD software can also be used to manage physical surface definitions.

Computational models of products or physical processes, their operation, and the associated environment are used by engineers in the design and analysis of products and in determining their operating characteristics. Desktop computers with Graphics Processing Units (GPUs) have enabled rapid visualization of 3D geometries associated with computational models. These computational models can include the device's associated operating environment. This can include, but is not limited to, showing fluid dynamics properties, eddy currents, and combustion specifics.

Two prior art techniques used in the field of visualization include "post-processing" and "in-situ" processing of computational geometries. "Post-processing" of computational geometries involves generating visualization output of a completed computer simulation. In one prior art method, the full computational model is loaded into memory where a user can navigate in 3D dimensional space to inspect quantities of interest. This approach demands larger and larger dedicated visualization computer clusters to keep pace with the current trend in computer simulation towards High Performance Computing (HPC). In these architectures, simulation is performed on a remote server utilizing many high performance computer processors.

The challenge with a "post-processing" technique is that the data for visualization is typically large, is located on a remote server, and does not easily fit on a desktop computer. For post-processing, the post-processing file needs to be transferred either locally or to a visualization cluster of servers. A large visualization data file needs to be generated in addition to native simulation data. These large datasets have to be loaded into the computer doing the visualization and run on a computer configured with specialized visualization software.

"In-situ" visualization responds to the above mentioned problems but also has limitations. In-situ visualization extracts visualization data during a simulation. This can require additional memory beyond memory required for the simulation. The drawback of "in-situ" visualization is the loss of user interactivity "post-processing" provides. Prior art in-situ visualization tools pre-specify, typically through text configuration files, the visualization data prior to simulation. Further, significant additional memory at runtime is required to process visualization data. Also, a full graphic rendering pipeline is required within the simulation code.

In light of the above discussion, there appears to be a need for an image-based visualization paradigm to address the coupled challenges of scalability and interactivity in the engineering design process with HPC. Further, what is needed is a system that provides a framework for a desktop computer, laptop, or tablet to interface over a network with a HPC system with an efficient method to transfer visualization information that preferably utilizes Web browser standard protocols for rendering views of the simulation. Additionally, what is needed is the ability for rapid and scalable visualization of temporal, spatially unstructured datasets, feature identification on complex 3D geometries, and quantitative surface data comparisons across computational models

OBJECTIVE OF INVENTION

The primary objective of the invention is 3D visualization of surfaces generated by a computational simulation that includes iso-surfaces and the computational geometry. In particular, the one aspect of the invention supplies a more computationally and system resource efficient framework and user interface for scalable visualization, analysis, and differential analysis of computational models that process and generate large amounts of data.

Another aspect of the invention relates to improving prior art 3D image rendering methods where the computational requirements grow non-linearly with the data set size and thereby would degrade prior art the visualization performance. Specifically, an aspect of the invention provides rapid and scalable visualization of temporal, spatially unstructured datasets, feature identification on complex 3D geometry data sets, and the quantitative surface data comparisons between computational models.

SUMMARY

The above-mentioned needs are met by a computer-implemented method, a computer program product and a system for a scalable interactive image-based visualization environment of computational model surfaces.

An example of a computer-implemented method to visualize an iso-surface includes generating a plurality of view-point images and view-point metadata of an iso-surface from the perspective of a plurality of view-points. The view-point meta data contains depth information for each pixel of the view-point image. The view-point images are located surrounding the computational geometry in three dimensions. Further, the computer-implemented method includes transferring one or more of the view-point images and view-point metadata to a client device, wherein the view-point images and view-point metadata are processed by a client user interface. Furthermore, the computer-implemented method includes displaying the one of the view-point images on the client device wherein each of the one or more view-point images and view-point metadata are formed into one or more a three dimensional model, and wherein the one or more view-point images are displayed on the client using a web interface to render the display image. The computer-implemented method includes receiving a user indication for a new user selected view-point and sending a request to the High Performance Computing cluster for a new view-point image, wherein the new user selected view-point image is from non view-point orientation. The computer-implemented method also includes generating a new user view-point image and pixel depth metadata, wherein the High Performance Computing cluster renders the image at a specific client side resolution and applies data compression. Moreover, the computer-implemented method includes transmitting the new user view-point image and pixel depth metadata to the client device and displaying the new user view-point image, wherein the client uses the web interface to render the display image.

An example of a computer program product to visualize an iso-surface includes generating a plurality of view-point images and view-point metadata of an iso-surface from the perspective of a plurality of view-points. The view-point metadata contains depth information for each pixel of the view-point image. The view-point images are located surrounding the computational geometry in three dimensions. Further, the computer program product includes transferring one or more of the view-point images and view-point metadata to a client device, wherein the view-point images and view-point metadata are processed by a client user interface. Furthermore, the computer program product includes displaying the one of the view-point images on the client device wherein each of the one or more view-point images and view-point metadata are formed into one or more a three dimensional model, and wherein the one or more view-point images are displayed on the client using a web interface to render the display image. The computer program product includes receiving a user indication for a new user selected view-point and sending a request to the High Performance Computing cluster for a new view-point image, wherein the new user selected view-point image is from non view-point orientation. The computer program product also includes generating a new user view-point image and pixel depth metadata, wherein the High Performance Computing cluster renders the image at a specific client side resolution and applies data compression. Moreover, the computer program product includes transmitting the new user view-point image and pixel depth metadata to the client device and displaying the new user view-point image, wherein the client uses the web interface to render the display image.

An example of a system for visualizing an iso-surface includes a client device. The system also includes a High Performance Computing cluster, wherein the High Performance Computing cluster is configured to generate a plurality of view-point images and view-point metadata of the iso-surface from the perspective of a plurality of view-points, wherein the view-point image data contains depth information for each pixel of the view-point image. The view-points are located surrounding the computational geometry in three dimensions. The High Performance Computing cluster is configured to transfer one or more of the view-point images and view-point metadata to the client device. The client device is configured to display one of the view-point images on the client device wherein each of the one or more view-point images and view-point metadata are formed into one or more three dimensional surfaces, and wherein the one or more surfaces are displayed on the client using a web interface to render the display image. Further the system includes a processor configured within the client device and operable to perform the method: generate a plurality of view-point images and view-point metadata of an iso-surface from the perspective of a plurality of view-points, transfer one or more of the view-point images and view-point metadata to a client device, display the one of the view-point images on the client device wherein each of the one or more view-point images and view-point metadata are formed into one or more a three dimensional model, receive a user indication for a new user selected view-point; send a request to the High Performance Computing cluster renders the image at a specific client side resolution and applies data compression, transmit the new user view-point image and pixel depth metadata to the client device and display the new user view-point image, wherein the client uses the web interface to render the display image.

These and other aspect of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a computer-implemented method and system for a scalable interactive image-based visualization environment of computational model surfaces. The following detailed description is intended to provide example implementations to one of ordinary skill in the art, and is not intended to limit the invention to the explicit disclosure, as one or ordinary skill in the art will understand that variations can be substituted that are within the scope of the invention as described.

Environment Block Diagram

Figure 1:
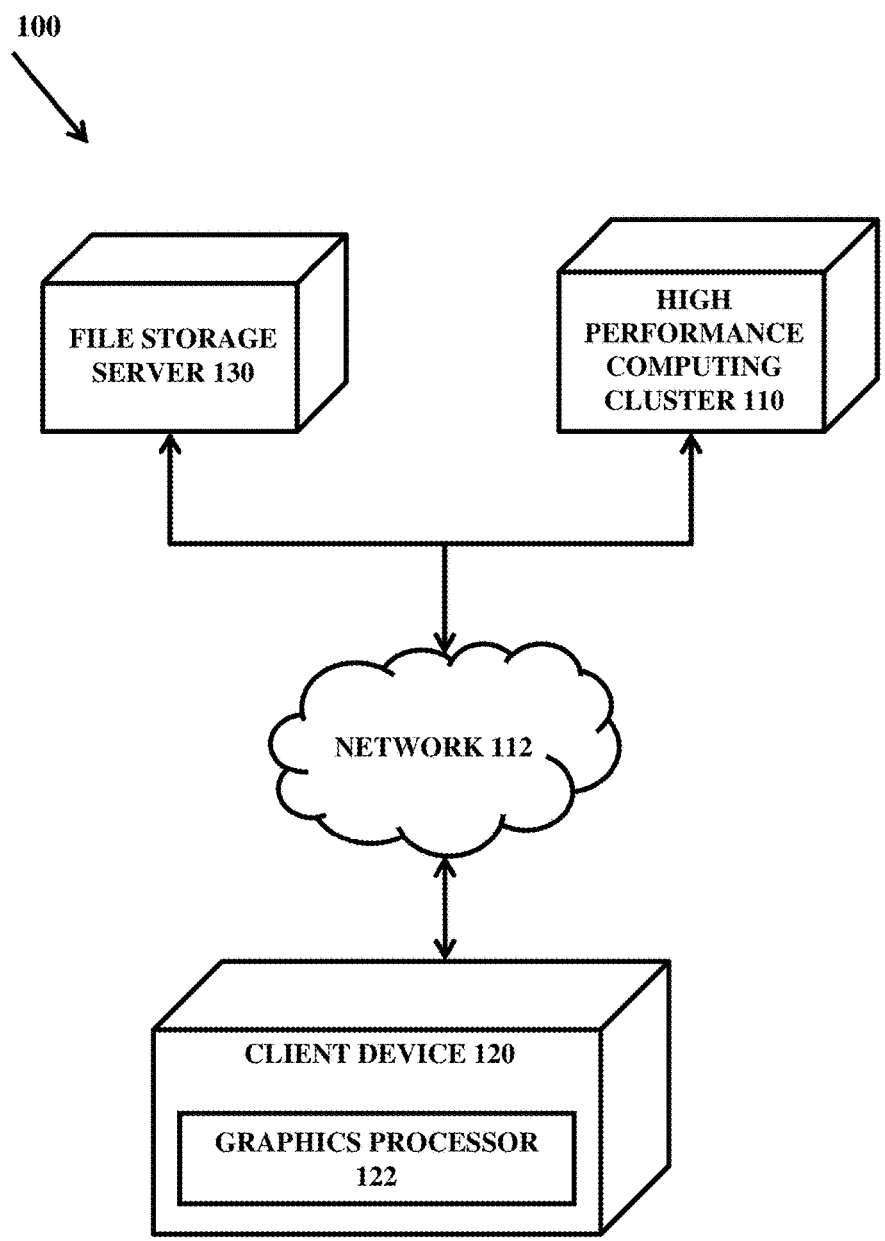
FIG. 1 is a block diagram of the environment, according to the embodiments as disclosed herein.

FIG. 1 is a block diagram of the environment, according to the embodiments as disclosed herein. The environment 100 includes a high performance computing cluster 110, a client device 120, a file storage server 130, a network 112 and a graphics processor 122.

The high performance computing cluster (HPC) 110 is typically a shared resource with a large number of high performance processors not typically found a client device 120. Any simulation code can run on the HPC 110. The only constraints on the simulation code are it needs to describe the surfaces for the computational geometry and the iso-surfaces.

The client device 120 may include a mobile computing device or any other portable device. In an embodiment, the mobile computing device includes a mobile telephone, laptop, tablet, computing pad, net books and the like. The client device 120 may include less portable devices such as desktop personal computers, kiosks and tabletop devices.

The client device 120 can be any computer that is capable of running Web standard protocols, preferable HTML5 and WebGL. Further, the client device 120 includes a graphics processor 122 to efficiently render and display the 3D images.

Further, the client device 120 is configured with a processor (not shown in FIG. 1). The processor is configured with a non-transitory computer-readable medium, the contents of which cause the client device 120 to perform the method disclosed herein.

The file storage server 130 stores view-point images. Typically, view-point images are generated on the HPC. Each view-point image is a three dimensional representation which enables construction of a 3D client side surface model. In other words, each view-point image represents a surface with its own model coordinate system.

Network link(s) involved in the system of the present invention may include any suitable number or arrangement of interconnected networks including both wired and wireless networks. By way of example, a wireless communication network link over which mobile devices communicate may utilize a cellular-based communication infrastructure. The communication infrastructure includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link may further include, or alternately include, a variety of communication channels and networks such as WLAN/Wi-Fi, WiMAX, Wide Area Networks (WANs), and Blue-Tooth.

It should be appreciated by those of ordinary skill in the art that FIG. 1 depicts the client device 120 in an oversimplified manner, and a practical embodiment may include additional components and suitably configured processing logic to support known or conventional operating features that are not described in detail herein.

Schematic Representation of Three Dimensional Iso-Surface

Figure 2:
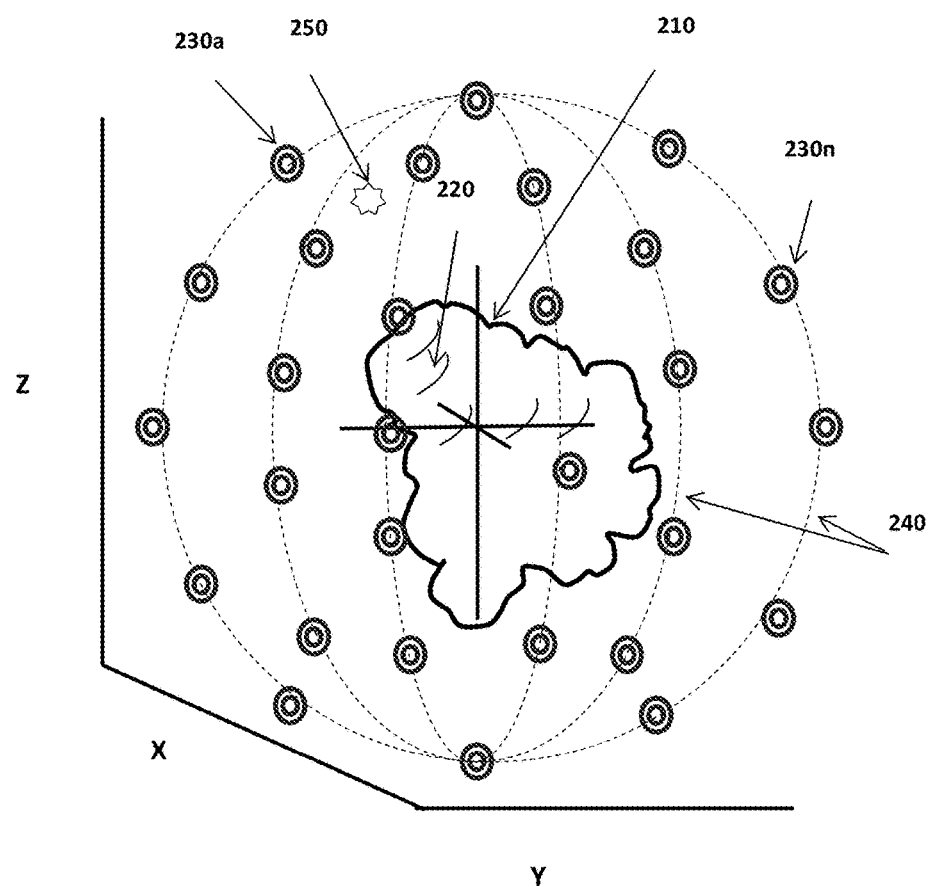
FIG. 2 is a schematic diagram depicting a diagram of the computational geometry and view-points used to form a three dimensional iso-surface, according to the embodiments as disclosed herein.

FIG. 2 is a schematic diagram depicting a diagram of the computational geometry and view-points used to form a three dimensional iso-surface, according to the embodiments as disclosed herein.

Referring to FIG. 2, aspects of generating images that provide for rotating the iso-surface of the computational geometry is described. The simulation code on the HPC 110 generates a computational geometry and iso-surface from which images are generated.

A number of view-points 230(*x*), wherein x is a variable and can take various values, are placed around the computational geometry. For example, x can have a value "a" for view-point 230*a* and a value "n" for view-point 230(*n*). x can also have values from 1 to 42 for 42 view-points. For each view-point, a view-point image is generated. In one embodiment, the view-points 230(*x*) are positioned spherically 240 surrounding the computational geometry 210. Preferably, there are forty-two view-points but there can be fewer or more. Forty-two viewpoints provides for a uniform spherical triangle discretization surrounding the computational geometry and iso-surface. However, if insufficient view-points 230(*x*) are used or if the spacing is non-uniform, there could be insufficient data in rendering an image from a new user selected view-point 250. The 3D view-point images of the iso-surface might have insufficient data to generate user selected view-point image from any arbitrary position.

For each view-point, a view-point image is generated on the HPC. The orientation of the image is included as part of the image metadata. The image can be formed using a ray-tracing algorithm. One skilled in the art of generating images from a computational geometry would be familiar with the ray-tracing technique and other techniques for generating 3D view-point image of the iso-surface.

Further, the metadata includes depth information for each pixel in the view-point image. Thus, each view-point image is a three dimensional representation which enables construction of a 3D client side surface model. This is the foundation for visualizing from an arbitrary user-view point 250.

Three or more near view-points 230(*x*) can be rotated to the user selected view-point and combined to generate a new user-view point 250 image. Each image view-point represents a surface with its own model coordinate system. One skilled in the art of graphics processing would know the techniques in mapping three or more model surfaces to a world coordinate system to be imaged from an arbitrary view-point.

Additionally, a 'Zone Legend' image can be generated for each view-point. The zone legend is an image where boundaries for the computational geometry are indexed by pixel color. For example, in a combustion chamber, one zone can be the edges of the combustion chamber. Another zone could be the fuel injectors. Each of the legends can be mapped to a color or grayscale value. A legend mapping zone colorings to the zone names is stored in the metadata.

The zone legend information is transmitted to a client where a user can highlight boundary zones of the geometry and view the associated name-information that is often needed for setting simulation boundary conditions.

Generating New User View-Point Image

A user may want to view the computational geometry from a different view-point. Thus, a user on a client device will want to rotate the iso-surface for viewing from any user selected arbitrary position.

In one aspect of the invention, one or more the view-point images and pixel depth metadata is downloaded from the HPC 110 or from a file server 130. The client device 120 uses the pixel depth information to build a 3D surface from the 2D image at each of the view-points and render a view to a user.

Once a 3D surface is constructed from image data, the surface model can be rotated via a transformation matrix in a process familiar to experts in computer graphics. The result of the rotation is a new user determined view-point 250. Moving to this viewpoint triggers in the client device the processing of three view-point images rendered from three or more nearby viewpoints as well as associated zone legends. Using view-point images near the user selected view-point increases the probability that surfaces hidden in one view angle are adequately represented in the 3D model.

At a user specified viewpoint, the client device 120 displays geometry differs from the real computational geometry by surfaces hidden in all the processed image-viewpoints. When the client device 120 is connected to an HPC server 110, a request can be made to the HPC to generate an exact image at the user-specified viewpoint. This image can be processed into the client surface model to improve user view accuracy. Preferably, the client device 120 utilizes a web interface WebGL and HTML5 and device drivers to render a client side 3D surface from view-point images. WebGL (Web Graphics Library) is an API for rendering interactive 3D computer graphics and 2D graphics within any compatible web browser without the use of plug-ins.

Flow Diagram for Rapid Visualization and Inspection Method

Figure 3:
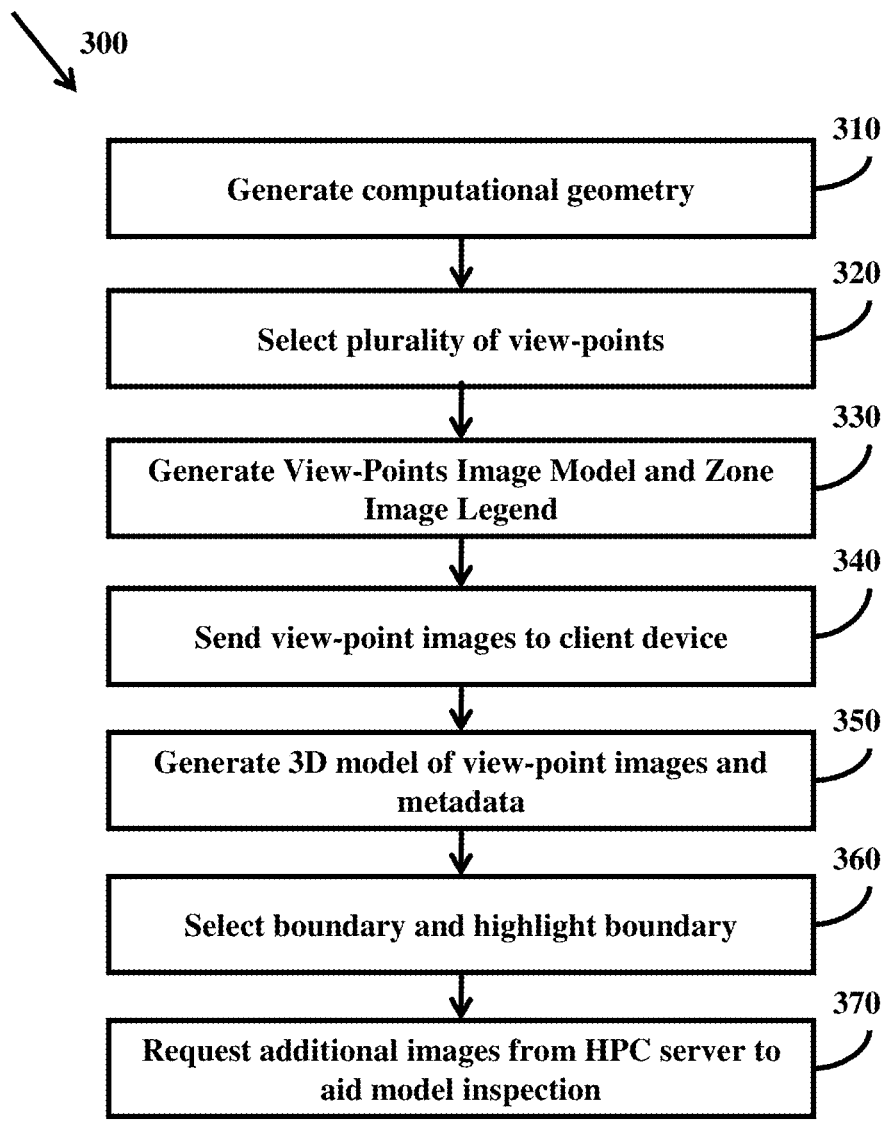
FIG. 3 is a flow diagram depicting a method of rapid visualization and inspection, according to the embodiments as disclosed herein.

FIG. 3 is a flow diagram depicting a method of rapid visualization and inspection, according to the embodiments as disclosed herein. Referring to FIG. 3, an aspect of visualization of a method of a computational geometry is shown and described. In an aspect of the invention, a method 300 provides a method of rapid model inspection and identification of boundary zones. The flow diagram begins at step 310.

In a first step 310, simulation code builds a computational geometry and prepares the geometry for rendering. Preferably, the simulation code runs on a high performance computing cluster (HPC). Additionally, metadata is also prepared for storage in the image files. The metadata includes zone names, view parameters which can be in the form of MVP matrix, and scale information that can include a variable range and pixel z-depth.

In a step 320, a set of view-points are generated by discretizing a sphere that encompasses the computational geometry. Preferably there are forty-two view-points spaced spherically around the iso-surface an equal distances from each other. However, more or fewer view-points are contemplated and other spacing schemes of view-points arrangements are contemplated.

In a step 330, for each of the view-points, a pair of images for each view-point is generated. The first image generated is a view-point of the computational geometry shaded for user inspection and the second is a zone legend image. Ray tracing can be used to generate an image of the computational geometry. One skilled in the art of 3D modeling and image processing would be familiar with the techniques to render a 2D image from a 3D model. The view-point image includes pixel depth metadata for reconstruction of a 3D surface from the 2D image.

The "zone legend" images include a mapping of the color pixels to named elements in the computational geometry. The name-color mapping is stored in the zone-legend image metadata. The mapping includes computational geometry boundary names and associated model condition at the boundaries. These image pairs can be computed before request by a client device and stored on a server. Alternatively, the image pairs can be computed as requested by a client device.

In a step 340, the images are transferred from the server or HPC to a client device where the images and metadata are processed by a client interface. Each pixel in the image is mapped to a location in a global 3D coordinate space using the pixel depth and viewpoint metadata. In the processing, view-point images are displayed to the user. 'Zone Legend' images are rendered in a hidden buffer. A custom vertex shader can leverage client hardware GPU acceleration to compute the transformations.

In a step 350, a client interface generates an interactive 3D model built from the view-point images sent to the client device. In one embodiment, WebGL and HTML5 standards are employed to build the user interface, render images for display, and thereby enable client device portability.'

In a step 360, through a client browser a user clicks on a region of the 'Geometry' image and the client interface highlights a portion of the surface defined by the 'Zone Legend' image.

In a step 370, a user generates a user interface rotation indication to a new user specified view-point. At this viewpoint the user may request the HPC server generate additional image-pairs to aid model inspection. The image pairs can be generated at higher resolution to elucidate small features or at custom view angles to reveal previously hidden surfaces. Preferably, the client device utilizes a web interface incorporating WebGL and HTML5 to render the view.

The flow diagram ends at step 370.

Flow Diagram for Complex Computational Geometry Comparison Method

Figure 4:
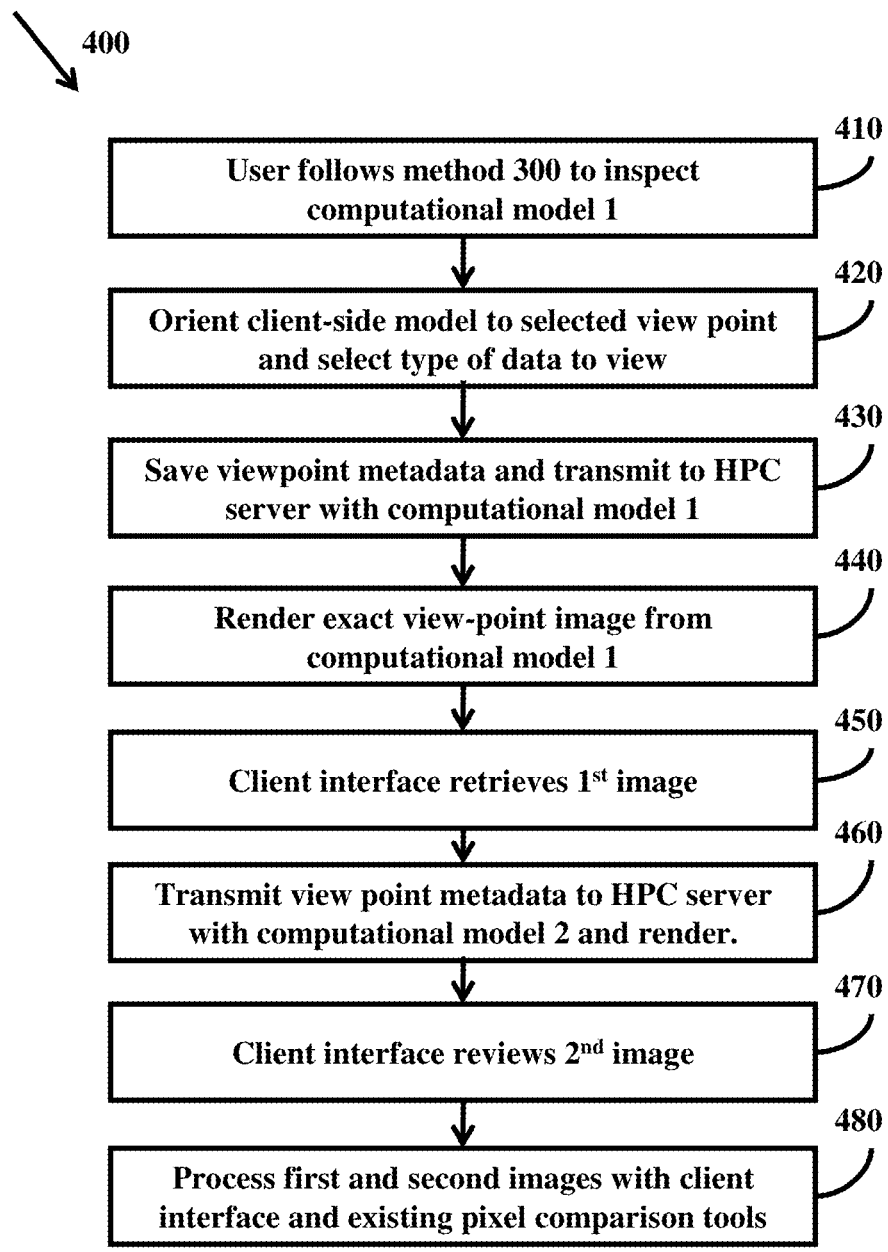
FIG. 4 is a flow diagram depicting complex computational geometry Comparison, according to the embodiments as disclosed herein.

FIG. 4 is a flow diagram depicting complex computational geometry Comparison, according to the embodiments as disclosed herein.

In another aspect of the invention, a method 400 to provide a comparison of data across complex, unstructured computational models is described. The method addresses difficulties of consistent comparisons of unstructured computational models. Large HPC simulations are often difficult to quickly visualize anything about the geometry. The disclosed method constructs a structured field of interpolated data from fixed viewpoints across computations on which to perform one to one data comparisons.

In a step 410, a user follows method 300 to inspect computational model 1.

In a step 420, the user rotates and zooms the client side surface to a desired view point and selects surface data for comparison.

In a step 430, metadata describing the viewpoint is saved and transmitted to the HPC resource where the exact computational model 1 resides.

In a step 440, the HPC resource renders an exact viewpoint image of computational model 1 based on the request metadata.

In a step 450, the client interface retrieves the exact view point image of computational model 1.

In a step 460, the viewpoint metadata from step 430 is transmitted to an HPC resource where computational model 2 resides.

In a step 470, the client interface retrieves the exact viewpoint image of computational model 2.

In a step 480, the first exact image and the second exact image are compared pixel by pixel with existing techniques.

Operational Example

The following is an exemplary example of the operation of aspects of the invention. The description is intended as an example and should not be construed as a limitation of the inventive concept.

First, a high performance cluster (HPC) FIG. 1-110 of computational devices executes a computational simulation that generates a 3D computational geometry FIG. 2-210 or a 3D iso-surface 220. A series of computational geometries and iso-surfaces may need to be generated to simulate a time varying simulation. The simulation code used to generate the computational geometry and iso-surface can be any simulation code so long as a surface is generated from the simulation.

Next a series of virtual view-points 230($x$) are selected. These view-points 230($x$) are orientated 360° around the computational geometry 210. Preferably, the distribution is around the surface of a sphere 240 which encompasses the computational geometry 210. The number of view-points can vary and do not have to be evenly space. However, too few view-points or improperly placed view-points can cause data gaps in a 3D model of the iso-surface. When a new user requested view-point is to be generated from three or more of the view-points to a user-selected view-point 250. The 3D information of the view-points 230(*x*) may be insufficient to recreate an accurate image.

Next, a view-point image is generated for each of the view-points 230(*x*). The view-point image is an image of the surface 220 as viewed from the view-point. In one embodiment, ray tracing with tree based reduction is used to generate a view-point image of the iso-surface 220. Other techniques to generate the image 220 can be used. One skilled in the art of image processing would know other techniques for generating the image 220.

The view-point image file includes metadata that includes depth information for each pixel in the image. Preferably, each view-point image and the associated metadata are compressed with a lossless algorithm. The image file can include metadata and can include simulation parameters. This depth metadata is necessary to accurately generate user-selected view-points other than the pre calculated view-point image. Lossless compression is applied to "pixel-depth" metadata. This reduces the file size of the resulting image file. Further, custom software programming is required on the HPC machine to compress the data and custom coding is applied on the client side to decompress. Compression of the view-point data provides the benefit that images are readily transmissible over a network to a client device 110 without a noticeable delay.

Each of the view-point images are stored in a file server 130 coupled to a network providing access to a client device 120 where users will have access to the simulation results.

Next, one or more of the view-point images and the associated metadata are sent to the client device. These images and associated metadata are decompressed and when combined with the pixel depth metadata, becomes a three dimensional model of the image view. A client device 120, having a GPU (Graphics Processor), and running a browser interface with Web standard protocols can utilize the HTML5 and WebGL interfaces and code to render a 3D surface from the view-point images. These protocols and associated drivers will remove hidden pixels from each of the view-point images sent to the client device.

The client can request a new view-point of the computational geometry. The new view point is a user-selected view-point 250. This request is sent from the client 120 to the HPC 110. The HPC 110 constructs an exact new view-point 2D image with pixel depth information stored in the metadata. Ray tracking is one technique that can be used to generate the view-point image.

The new user-selected view-point image is compressed and with the associated pixel depth metadata and sent back to the client device. The client device decompresses the image and metadata into a 3D surface from the 2D image and metadata. The clients display graphics are updated with the new user-selected view-point. The new user-selected view-point image is displayed along with the other view-point images that have been downloaded. The use of HTML5/WebGL graphics software is designed to efficiently remove surfaces that are not visible from the new user-selected view-points. This technique is also called z-buffering. A view of the computational geometry from the new user selected view-point is displayed to the user on the client device.

Schematic Diagram of Image Pairing

Figure 5:
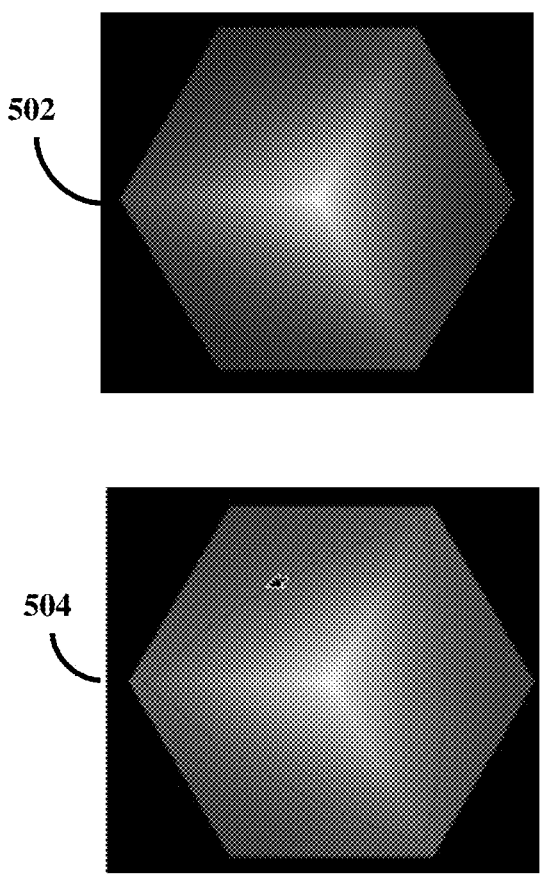
FIG. 5 is a schematic diagram illustrating image pairing, according to the embodiments as disclosed herein.

FIG. 5 is a schematic diagram illustrating image pairing, according to the embodiments as disclosed herein A set of geometry image and zone legend image pairs are generated. Each image pair is captured from a different camera view point. View points are obtained by discretizing a sphere encompassing the computational geometry.

"Zone Legend" images have their pixel colors mapped to named elements in the computational geometry. The name-color mapping is stored in image metadata. A zone legend image 502 is hidden from the user view. The pixel colors correspond to named geometry elements.

"Geometry" images include depth metadata for reconstruction of the 3D coordinate system. A geometry image 504 is composed of an arbitrary color shading (grayscale). By clicking on a region of the "geometry" image, pixels that match "Zone Legend" mapping are highlighted. Subsequently, a name is displayed (for example, Zone Name: surface_81).

System Block Diagram

Figure 6:
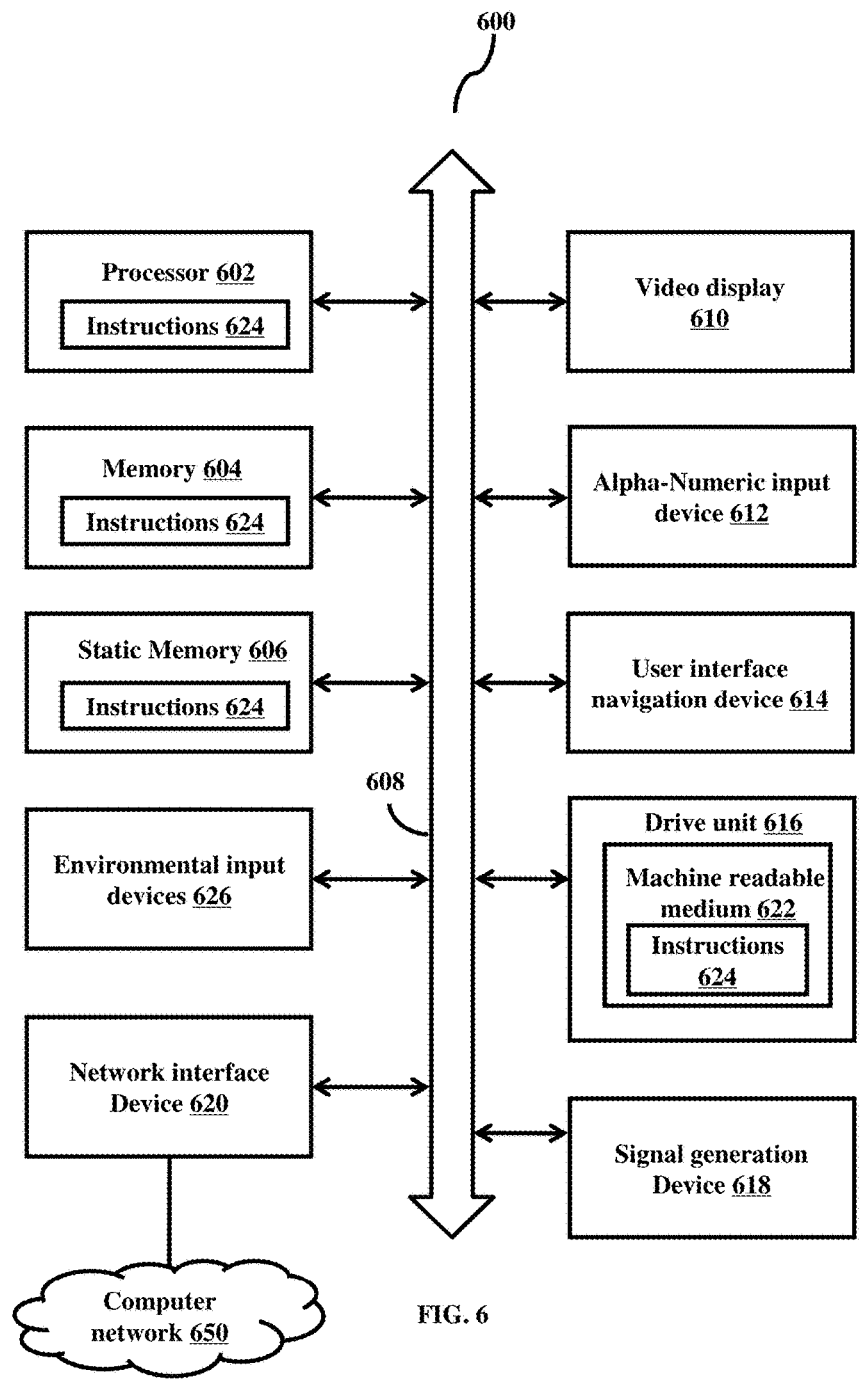
FIG. 6 is a block diagram of a machine in the example form of a computer system within which instructions for causing the machine to perform any one or more of the methodologies discussed herein may be executed.

FIG. 6 is a block diagram of a machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 606. The computer system 606 may further include a video display unit (e.g., a liquid crystal displays (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620. The computer system 600 may also include a environmental input device 626 that may provide a number of inputs describing the environment in which the computer system 600 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 624 may further be transmitted or received over a computer network 650 using a transmission medium. The instructions 624 may be transmitted using the network interface device 620 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from Math Works), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

What is claimed is:

1. A computer-implemented method for visualizing an iso-surface, the computer-implemented method comprising:
   receiving one or more view-point images and view-point metadata of a computational geometry at a client device from a High Performance Computing (HPC) cluster, wherein the view-point images and the view-point metadata are processed at the client device, wherein the view-point metadata is stored along with the view-point images and comprises depth information for each pixel of the view-point images, and wherein view-points are generated by discretizing a sphere that encompasses the computational geometry in three-dimensions, the view-points being located equidistantly;

receiving one or more zone legend images and zone legend metadata of the computational geometry, wherein the zone legend images and the zone legend metadata comprises mappings of boundaries of zones of the computational geometry indexed by pixel color, each zone comprising an element of the computational geometry having a name and corresponding color mapped to the name;

processing the view point images and view-point metadata, and the zone legend images and zone legend metadata, using a client interface built via WebGL or HTML standards, to generate interactive three dimensional model and to display one or more view-point images on the client device, wherein each of the one or more view-point images and view-point metadata are formed into the interactive three dimensional model, wherein the zone legend images are rendered in a hidden buffer using a custom vertex shader that leverages GPU acceleration on the client device to compute transformations;

receiving a user click on a zone of the zone legend image;

highlighting surface of the computational geometry defined by the zone;

receiving a user indication for a new user selected view-point;

sending a request to the High Performance Computing cluster for a new view-point image, wherein the new user selected view-point image is from non view-point orientation;

receiving a new user view-point image and pixel depth metadata, and associated zone legend image at the client device, wherein the new user view-point image is generated by identifying three or more view-points for the new user selected view-point and then using three or more view-point images and view-point metadata corresponding to the identified three or more view-points, wherein the new user view-point image is generated at a specific higher client side resolution and lossless compression is applied;

decompressing the new user view-point image and corresponding view-point metadata using a custom coding at the client device; and displaying the new user view-point image and the associated zone legend image using the client interface built via WebGL or HTML standards.

2. The computer-implemented method of claim 1 further comprising:

sending the new user view-point to at least two different HPC clusters, the at least two different HPC clusters comprising a first HPC cluster having a first computational model and a second HPC cluster having a second computational model;

receiving a first view point image from the first HPC cluster and a second view point image from the second HPC cluster; and comparing the first view point image and the second view point image pixel by pixel.

3. The computer-implemented method of claim 1 wherein the view-point metadata includes zone names, view parameters that are in the form of MVP matrix and scale information that includes a variable range and pixel z-depth.

4. The computer-implemented method of claim 1 wherein the view-point images include pixel depth metadata for reconstruction of a 3D surface from the 2D image.

5. The computer-implemented method of claim 1 and further comprising: mapping each pixel in the view-point images to a location in a global 3D coordinate space using the pixel depth and viewpoint metadata.

6. A non-transitory computer-readable medium comprising a memory for storing instructions that when executed by a processor, performs a method for visualizing an iso-surface, the method comprising:

receiving one or more view-point images and view-point metadata of a computational geometry at a client device from a High Performance Computing (HPC) cluster, wherein the view-point images and the view-point metadata are processed at the client device, wherein the view-point metadata is stored along with the view-point images and comprises depth information for each pixel of the view-point images, and wherein view-points are generated by discretizing a sphere that encompasses the computational geometry in three-dimensions;

receiving one or more zone legend images and zone legend metadata of the computational geometry, wherein the zone legend images and the zone legend metadata comprises mappings of boundaries of zones of the computational geometry indexed by pixel color, each zone comprising an element of the computational geometry having a name and corresponding color mapped to the name;

processing the view point images and view-point metadata, and the zone legend images and zone legend metadata, using a client interface built via WebGL or HTML standards, to generate interactive three dimensional model and to display one or more view-point images on the client device, wherein each of the one or more view-point images and view-point metadata are formed into the interactive three dimensional model, wherein the zone legend images are rendered in a hidden buffer using a custom vertex shader that leverages GPU acceleration on the client device to compute transformations;

receiving a user click on a zone of the zone legend image;

highlighting surface of the computational geometry defined by the zone;

receiving a user indication for a new user selected view-point;

sending a request to the High Performance Computing cluster for a new view-point image, wherein the new user selected view-point image is from non view-point orientation;

receiving a new user view-point image and pixel depth metadata, and associated zone legend image at to the client device, wherein the new user view-point image is generated by identifying three or more view-points for the new user selected view-point and then using three or more view-point images and view-point metadata corresponding to the identified three or more view-points, wherein the new user view-point image is generated at a specific higher client side resolution and lossless compression is applied;

decompressing the new user view-point image and corresponding view-point metadata using a custom coding at the client device; and displaying the new user view-point image and the associated zone legend image using the client interface built via WebGL or HTML standards.

7. The non-transitory computer-readable medium of claim 6 further comprising:
sending the new user view-point to at least two different HPC clusters, the at least two different HPC clusters comprising a first HPC cluster having a first computational model and a second HPC cluster having a second computational model;
receiving a first view point image from the first HPC cluster and a second view point image from the second HPC cluster; and
comparing the first view point image and the second view point image pixel by pixel.

8. The non-transitory computer-readable medium of claim 6 wherein the view-point metadata includes zone names, view parameters that are in the form of MVP matrix and scale information that includes a variable range and pixel z-depth.

9. The non-transitory computer-readable medium of claim 6 wherein the view-point images include pixel depth metadata for reconstruction of a 3D surface from the 2D image.

10. The non-transitory computer-readable medium of claim 6 and further comprising:
mapping each pixel in the view-point images to a location in a global 3D coordinate space using the pixel depth and viewpoint metadata.

11. A system for visualizing an iso-surface, the system comprising:
a client device in communication with a High Performance Computing (HPC) cluster, wherein the High Performance Computing cluster is configured to generate a plurality of view-point images and view-point metadata of the iso-surface from the perspective of a plurality of view-points, wherein the view-point image data contains depth information for each pixel of the view-point image;
wherein the view-points are located surrounding a computational geometry in three dimensions;
wherein the High Performance Computing cluster is configured to transfer one or more of the view-point images and view-point metadata to the client device,
wherein the client device is configured to display the one of the view-point images on the client device wherein each of the one or more view-point images and view-point metadata are formed into one or more a three dimensional surfaces, and wherein the one or more surfaces are displayed on the client using the web interface to render the display image,
the client device comprising a processor configured and operable to perform:
receive one or more view-point images and view-point metadata of the computational geometry, wherein the view-point metadata is stored along with the view-point images and comprises depth information for each pixel of the view-point images, and wherein view-points are generated by discretizing a sphere that encompasses the computational geometry in three-dimensions, the view-points being located equidistantly;
receive one or more zone legend images and zone legend metadata of the computational geometry, wherein the zone legend images and the zone legend metadata comprises mappings of boundaries of zones of the computational geometry indexed by pixel color, each zone comprising an element of the computational geometry having a name and corresponding color mapped to the name;
process the view point images and view-point metadata, and the zone legend images and zone legend metadata, using a client interface built via WebGL or HTML standards, to generate interactive three dimensional model and to display one or more view-point images on the client device, wherein each of the one or more view-point images and view-point metadata are formed into the interactive three dimensional model, wherein the zone legend images are rendered in a hidden buffer using a custom vertex shader that leverages GPU acceleration on the client device to compute transformations;
receive a user click on a zone of the zone legend image;
highlight surface of the computational geometry defined by the zone;
receive a user indication for a new user selected view-point;
send a request to the High Performance Computing cluster for a new view-point image, wherein the new user selected view-point image is from non view-point orientation;
receive a new user view-point image and pixel depth metadata, and associated zone legend image at to the client device, wherein the new user view-point image is generated by identifying three or more view-points for the new user selected view-point and then using three or more view-point images and view-point metadata corresponding to the identified three or more view-points, wherein the new user view-point image is generated at a specific higher client side resolution and lossless compression is applied;
decompress the new user view-point image and corresponding view-point metadata using a custom coding at the client device; and
display the new user view-point image and the associated zone legend image using the client interface built via WebGL or HTML standards.

12. The system of claim 11, wherein the client device further comprises:
a graphics processor to render and display the 3D images efficiently; and
a web interface to display one or more view-point images.

13. The system of claim 11 and further comprising:
a network to allow users to access simulation results on the client device; and
a file storage server coupled to the network to store view-point images.

14. The system of claim 11 wherein the client device further comprises a client user interface to generate an interactive 3D model built from the view-point images.

* * * * *